(12) United States Patent
Meyer

(10) Patent No.: US 7,000,735 B2
(45) Date of Patent: Feb. 21, 2006

(54) METHOD AND SYSTEM FOR THE PRESENTATION OF MULTIMEDIA CONTENTS IN ELEVATOR INSTALLATIONS

(75) Inventor: Thomas Meyer, Rotkreuz (CH)

(73) Assignee: Inventio AG, Hergswil NW (CH)

( * ) Notice: Subject to any disclaimer, the term of this patent is extended or adjusted under 35 U.S.C. 154(b) by 0 days.

(21) Appl. No.: 10/375,637

(22) Filed: Feb. 27, 2003

(65) Prior Publication Data

US 2003/0164268 A1    Sep. 4, 2003

(30) Foreign Application Priority Data

Mar. 1, 2002    (EP) .................................. 02405158

(51) Int. Cl.
B66B 1/34    (2006.01)
(52) U.S. Cl. ....................................... 187/391; 187/247
(58) Field of Classification Search ................ 187/247, 187/248, 391, 392, 393, 396; 705/10, 14; 455/414, 426, 566; 704/275, 246, 251; 235/375; 456/414–415
See application file for complete search history.

(56) References Cited

U.S. PATENT DOCUMENTS

| 5,339,391 | A | * | 8/1994 | Wroblewski et al. ....... 345/607 |
| 5,606,154 | A | | 2/1997 | Doigan et al. |
| 5,923,252 | A | | 7/1999 | Sizer et al. |
| 6,082,500 | A | | 7/2000 | Amo et al. |
| 6,288,688 | B1 | | 9/2001 | Hughes et al. |
| 6,349,797 | B1 | | 2/2002 | Newville et al. |
| 6,484,148 | B1 | * | 11/2002 | Boyd ........................... 705/14 |
| 6,615,175 | B1 | * | 9/2003 | Gazdzinski ................. 704/275 |
| 6,633,985 | B1 | * | 10/2003 | Drell ........................... 713/201 |
| 2002/0013144 | A1 | * | 1/2002 | Waters et al. ............... 455/414 |
| 2002/0129995 | A1 | * | 9/2002 | Friedli et al. ................ 187/392 |
| 2003/0209392 | A1 | * | 11/2003 | DiFranza et al. ............ 187/391 |
| 2004/0034794 | A1 | * | 2/2004 | Mayer et al. ................ 713/200 |
| 2004/0093608 | A1 | * | 5/2004 | Sprogis ....................... 719/327 |
| 2004/0193518 | A1 | * | 9/2004 | Deplazes ...................... 705/34 |
| 2004/0222134 | A1 | * | 11/2004 | Boyd .......................... 235/375 |

FOREIGN PATENT DOCUMENTS

| DE | 43 08 193 | 9/1994 |
| JP | 05319715 | 12/1993 |
| WO | WO 01/44095 A1 | 6/2001 |
| WO | WO 01 61612 | 8/2001 |

OTHER PUBLICATIONS

Micromuse "security Management", Jan. 29, 2002, www.micromuse.com/int/pr-display.cgi?&ID=10245.*

* cited by examiner

Primary Examiner—Jonathan Salata
(74) Attorney, Agent, or Firm—Butzel Long

(57) ABSTRACT

A system presents multimedia contents in elevator installations. At least one user profile with multimedia contents is provided for an associated elevator user. When the user is identified in proximity to the elevator system, the multimedia contents carried in his user profile are presented to him. The multimedia contents are made available to the elevator installation through a protective wall.

18 Claims, 2 Drawing Sheets

METHOD AND SYSTEM FOR THE PRESENTATION OF MULTIMEDIA CONTENTS IN ELEVATOR INSTALLATIONS

BACKGROUND OF THE INVENTION

The present invention relates to a procedure, a system and a computer program product for the presentation of multimedia contents in elevator installations.

The U.S. Pat. No. 6,288,688 shows a computer-aided system for the distribution and display of digital advertisements (short messages) within elevator cars. Screens are installed in the elevator cars and such screens are connected with a monitoring unit by means of communication connections. The monitoring unit has a data storage device with a plurality of stored digital advertisements. The digital advertisement being individually addressed is dispatched to the screens.

By multimedia is understood the integration of different media in a device. Multimedia contents consist of music compositions, SMS (Short Message service), EMS (Enhanced Messaging service), MMS (Multimedia Messaging service), texts, pictures, videos, movies, but also of scents, lighting effects, etc. Multimedia contents can be presented by means of computers through input and output devices such as screens, loudspeakers, keyboards, microphones, atomizer, lamps, etc.

SUMMARY OF THE INVENTION

The present invention concerns a procedure, a system and a computer program product in order to offer multimedia contents in elevator installations. In particular, individually tailor-made multimedia contents based on the user of the elevator installation are presented.

The present invention concerns a method for the presentation of multimedia contents in elevator installations comprising the steps of: a) providing at least one user profile with multimedia contents for an associated user of an elevator installation; b) separating the multimedia contents from the elevator installation with a protective wall; c) identifying the associated user when the associated user is within a predetermined proximity to the elevator installation; and d) presenting to the identified associated user multimedia contents carried within the at least one user profile through the protective wall.

The present invention also concerns a system for the presentation of multimedia contents in elevator installations comprising: at least one recognition device for recognizing an identification code of a user of an elevator installation; at least one examination device connected to said at least one recognition device for identifying the recognized identification code; at least one contents database storing for the user at least one user profile with multimedia contents and being connected to said at least one examination device; at least one output device connected to said at least one examination device for presenting to the user the multimedia contents carried in the at least one user profile from said at least one contents database when the recognized identification code is identified by said at least one examination device; and a protective wall connected between said contents database and said at least one examination device of the elevator installation.

The present invention further concerns a computer program product for the presentation of multimedia contents in elevator installations comprising: a comparison means for comparing at least one recognized identification code of a user of an elevator installation with a plurality of identification addresses; an allocation means for supplying a positive allocation result when the at least one recognized identification code is identical to one of the plurality of identification addresses; an assignment means for assigning a user profile with multimedia contents to the identical one of the plurality of identification addresses; and a protective wall means for loading the multimedia contents into the elevator installation.

According to the present invention, at least an individualized user profile with multimedia contents is carried for a user. This user profile is customized; i.e. it contains preferential multimedia contents selected by the user. The user profile contains much information; i.e. the user selects preferential multimedia contents from a large offer. The user profile is far-reaching; i.e. the user receives multimedia contents, wherever he is identified.

Preferably, the user is identified before rather than after entering an elevator car. The identification takes place, preferably, via an identification code. An examination device examines the validity of this recognized identification code. With a valid identification code, the user is considered as identified.

An identified user is presented multimedia contents, which are carried in its user profile. Preferably, these multimedia contents are loaded from at least one contents database and presented through at least one output device before, or respectively in the elevator car. Multimedia contents are made available by at least one provider and stored on request in the contents database. Preferably, multimedia contents categorized by demographic travelling preferences, psychographics travelling preferences as well as situational travelling preferences are presented.

The communication of the contents database and the elevator installation itself with the external world is made through a protective wall. Multimedia contents are therefore by means of the protective wall made available separately from the elevator installation. In such a way, any hackers and Internet viruses are prevented from accessing the elevator installation via the communication link with the external world.

The system works with well known and proven means of the communication technique and can be added to already installed elevator installations. Hereto are installed at least one recognition device for recognizing an identification code, at least one examination device for identifying a user on the basis of a recognized identification code, at least one contents database for linking at least one user profile with multimedia contents and at least one output device for presenting multimedia contents carried in the user profile.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
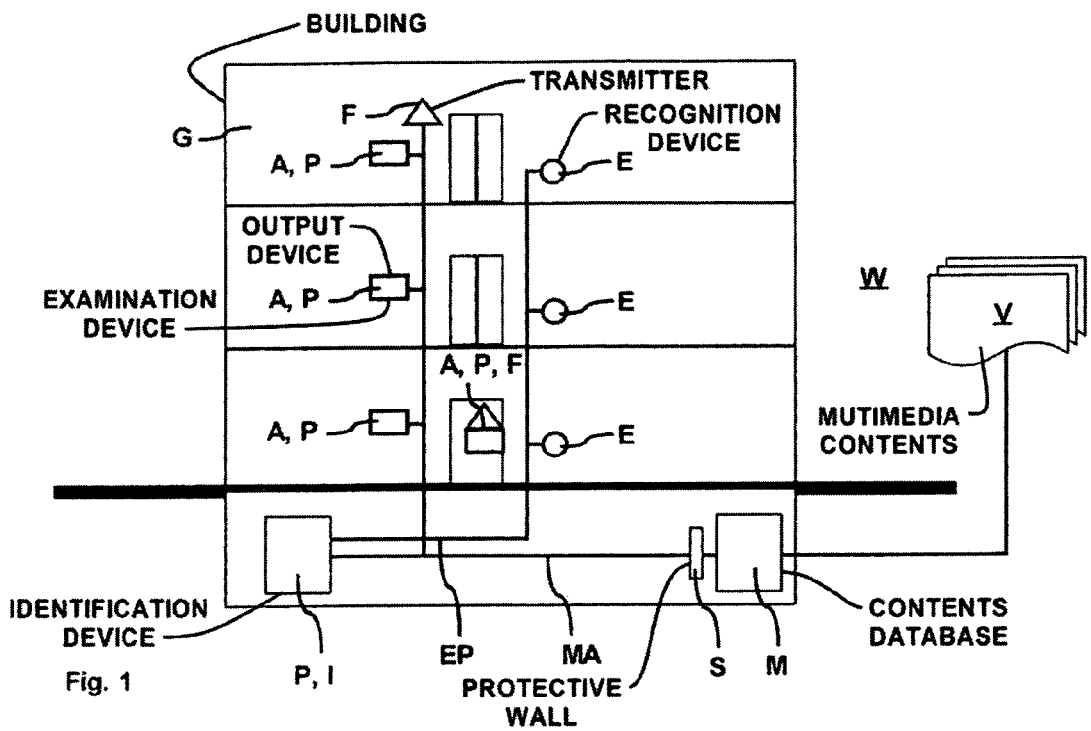
FIG. 1 is a schematic representation of a system according to the present invention for the presentation of multimedia contents in elevator installations.

With respect to the system in association with an elevator installation: FIG. 1 shows schematically a system according to the present invention for the presentation of multimedia contents in elevator installations. The system includes at least one recognition device E, at least one examination device P, at least one identification database I, at least one elevator control B, at least one contents database M as well as at least one output device A. The elevator installation is installed in a building G, or respectively a block of buildings and transports users from one floor to another floor. In accordance with FIG. 1, three floors are represented. The elevator installation is operated, for example electrically or hydraulically. Preferably, on each floor a recognition device E as well as an output device A are installed beside a floor or hallway door to the elevator installation. Alternatively, it is also possible to install only one recognition device E, for example at the ground floor of the building G. Preferably, another one of the output devices A is installed in an elevator car of the elevator installation. In accordance with FIG. 1, the elevator car is located in the ground floor of the building G, and the output device A of the elevator car is to be recognized through the open elevator doors. In accordance with FIG. 1, the examination device P, the identification database I and the contents database M are located in a basement of the building G and the elevator control B (not shown) is located on an upper floor of the building G.

Figure 2:
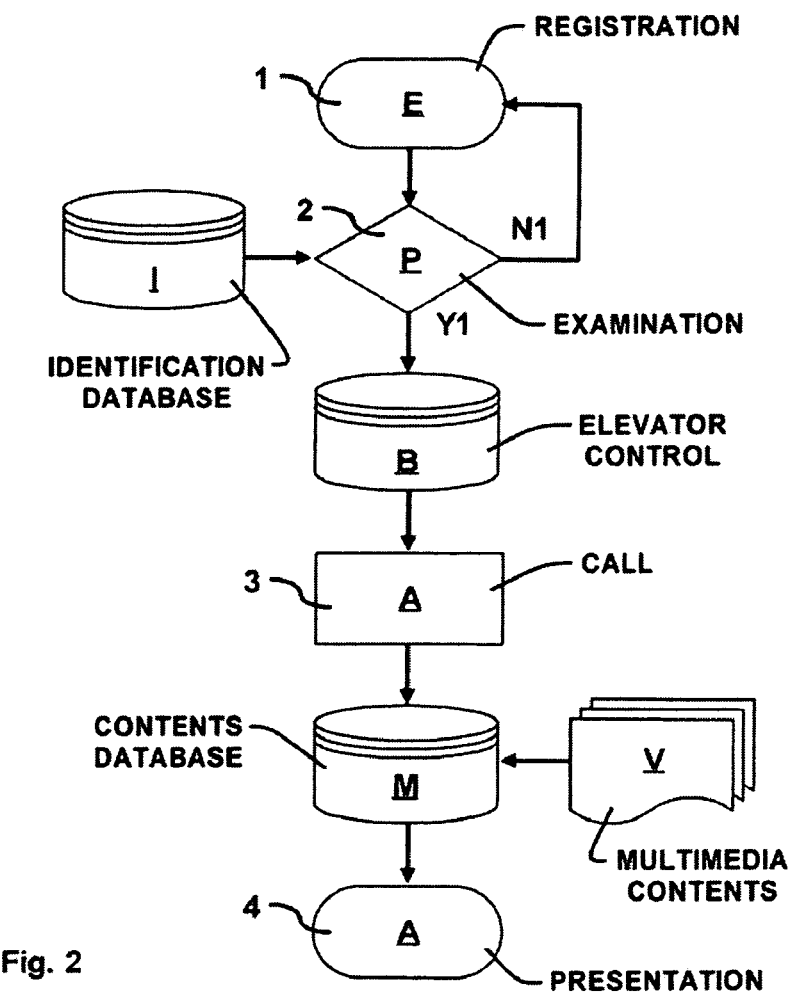
FIG. 2 is a flow diagram of the system of FIG. 1 for the presentation of multimedia contents in elevator installations.

With respect to the identification: FIG. 2 shows an exemplary embodiment form of the system according to the present invention for the presentation of multimedia contents. For the presentation of multimedia contents, a user logs onto the system with an identification code. Such a registration 1 takes place, preferably through the recognition device E for recognizing an identification code. In this connection, several construction forms of the registration 1 can be differentiated.

In a first preferred embodiment form of the registration 1, the identification code is transmitted by an identification device (not shown) to the recognition device E. Such contactless recognition of an identification code is well known from the European patent EP 699 617. The identification device can be a transponder with a transponder antenna and transmitting electronics. The transmitting electronics of the identification device include a sending unit and a receiving unit and a data storage device with at least one identification code. The identification device is fed by induction through an electromagnetic field with an operating voltage. Preferably, the recognition device E emits such an electromagnetic field. As soon as the identification device is located in the proximity of the recognition device E, it is supplied with energy and it sends the identification code to the recognition device E. For example, the identification device is maintained hereto some centimeters up to several meters distance from the recognition device E. The recognition device E receives the identification code through an accordingly developed sending and receiving antenna. Any readable and/or able to be written information devices respectively recognition devices can be used. So, information devices that communicate based on light and contactlessly with a recognition device like a scanner are likewise applicable. Also applicable are information devices in the form of magnetic cards, electronic chip, etc., which communicate through at least an intermediate contact with a recognition device.

In a further embodiment of the registration 1, the identification code is entered by the user mechanically, for example through a keyboard of the recognition device E and/or acoustically, for example through a microphone of the recognition device E. Of course, the person skilled in the art, having knowledge of the present invention, may realize other input devices, respectively output devices such as the output device A with a touch-sensitive screen surface, a mobile telephone keyboard, etc.

Finally, it is possible to recognize a biometric identification code of the user, such as a fingerprint, an iris pattern, a face profile, etc. with a recognition device.

With respect to the examination: The recognition device E further transmits the recognized identification code for an examination 2 to the examination device P. At least one of the examination devices P is necessary; however, several of the examination devices P can be used. The examination device P is computer-aided. Under "computer-aided" is understood a commercially available computing unit such as a PC (Personal Computer) with the operating system Windows, Apple, etc., or respectively a workstation with the operating system UNIX, etc. The identification database I is preferably a relational database such as Access, Lotus Notes, Oracle, SAP, etc. or respectively a XML (Extensible Markup Language) database, etc. The identification database I can be placed into a computer-aided device. The recognition device E, the examination device P and identification database I are equipped with inputs and outputs for communication. Preferably, the communication arises between the recognition device E, the examination device P and the identification database I on a recognition bus EP (FIG. 1) in accordance with a well known standard protocol such as PCI (Peripheral Component Interconnect) bus, Ethernet, token ring, etc., preferably by radio and/or cable. The examination device P can be developed mobile, or respectively fixed. The examination device P and the identification database I can be integrated, as shown in FIG. 1, into a single housing, but they can also be placed separately in different locations. Of course, it is also possible to realize the recognition device E, the examination device P and the identification database I in a single housing. Furthermore, it is possible to integrate the examination device P and the output device A, as shown in FIG. 1, into a single housing.

Preferably, a computer program product is installed into the examination device P. The computer program product compares the recognized identification code with identification addresses that are stored in the identification database I. The user is unequivocally identifiable through an identification address. For each identification address, an identification code exists. For example, an identification address is to be assigned exactly to a recognized identification code, if the identification address and the identification code are identical. In accordance with FIG. 2, the computer program product then supplies a positive allocation result Y1, if one of the stored identification addresses is identical to the identification code, and otherwise the computer program product supplies a negative allocation result N1. Such a negative allocation result is transmitted, for example, to the recognition device E, from which the identification code has been transmitted and the user is called up through the output device A of this recognition device E on a repeated registration 1. By reiterated negative allocation result, a neutral, not individualized guest address can be assigned to the user. The computer program product is written, for example, in a common and proven computer language. For example, the computer program product is stored into a storage unit and is loaded into a processor for the execution of the computer program product.

With respect to the allocation of multimedia contents: Multimedia contents from the contents database M are made available on a call 3 to the user identified accordingly to an identification code. The contents database M is computer-aided. It exhibits inputs and outputs for the communication with the examination device P, the output device A and a provider V. Preferably, at least one computer program product is installed into the contents database I and such computer program product assigns to an identification address of the user a user profile with multimedia contents, which are stored into the contents database M. Multimedia contents consist of music compositions, SMS, EMS, MMS, texts, pictures videos, movies, scents, lighting effects, etc. It applies also here that the computer program product can be written in a common and proven computer language. For example, the computer program product is stored into a storage unit and is loaded into a processor for the execution of the computer program product.

With respect to the transmission of multimedia contents: The multimedia contents conforming to an identification address are presented in a presentation 4 on the output device A, before, respectively in the elevator car. The contents database M and the output device A communicate, preferably, on a contents bus MA in accordance with a well known standard protocol such as PCI-bus, Ethernet, token ring, etc. by cables and/or by radio. Of course, it is also possible to transmit multimedia contents by mail, for example stored on a CD (compact disk).

Figure 3:
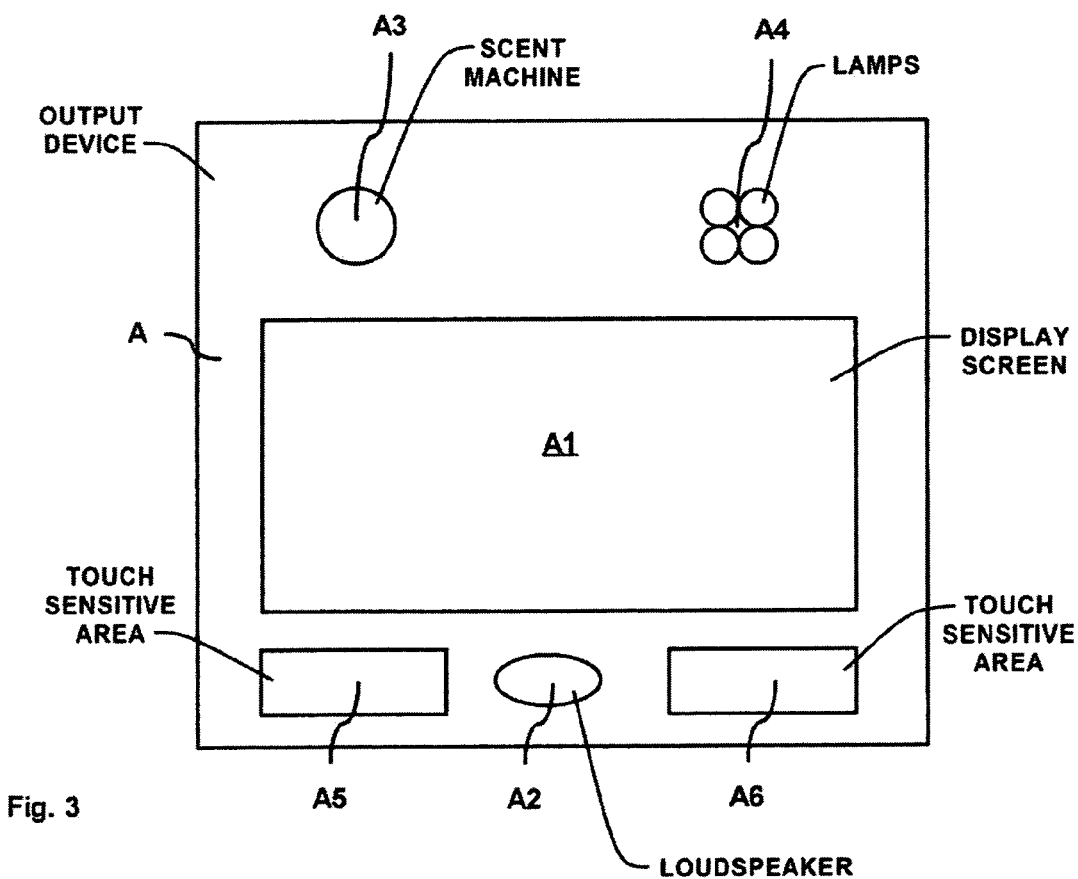
FIG. 3 is a schematic representation of an output device for the system shown in FIGS. 1 and 2.

In accordance with FIG. 1, the output devices A communicate in the floors by cables with the contents database M, while the output device A communicates in the elevator car by radio through a transmitter F and by cables with the contents database M. The output device A is for example, in accordance with FIG. 3, a panel with several areas A1, A2, A3, A4, A5, A6. For example, it concerns, in the case of the output device A, a computer-aided panel with first, second, third and fourth areas A1, A2, A3 and A4 respectively for the output of multimedia contents and with fifth and sixth areas A5 and A6 for the communication with the contents database M. The communication is preferably bi-directional. The output device A receives multimedia contents from the contents database M and transmits them into the first area A1 as a graphical representation, into the second area A2 as an acoustical representation, into the third area A3 as an aromatic representation, and into the fourth area A4 as an optical representation. For example, the first area A1 can be a visual display screen, the second area A2 can be a loudspeaker, the third area A3 can be a scent machine and the fourth area A4 can be a generator. By scent machine is understood a spray apparatus with a fragrance, or respectively with several, freely selectable and mixable fragrances and such spray apparatus sprays this/these fragrance/fragrances. By generator is understood at least a controllable, respectively adjustable lamp and such lamp emits lighting effects.

Preferably, the output device A transmits signals to the contents database M and to the examination device P. For example, the fifth and sixth areas A5 and A6 are touch-sensitive and enable the generation of such signals by the user. With such signals a user can, for example, select and confirm multimedia contents. For confirming multimedia contents the user operates the fifth area A5. For selecting multimedia contents the user operates the sixth area A6. So long as a user does not actively select multimedia contents, multimedia contents apply as desired. Of course, also other means for the generation of such signals are applicable, such as a microphone coupled with speech recognition for receiving language instructions. The person skilled in the art has in this connection, having knowledge of the present invention, multiple possibilities.

Preferably, at least one computer program product is installed in the contents database I, and such computer program product transmits multimedia contents of a user profile as at least one cookie to the output device A. By cookie is understood a file, which exhibits a sequence of multimedia contents, which is presented in a certain order. For example, a cookie consists of a sequence of ten sides, which is presented in a sequence page 1 through page 10. For example, it concerns thereby a sequel history, which is presented to a user during successive transportations in the elevator. The cookie notes the current stage of the sequence, so that after, for example, the presentation of the pages 1 and 2, with a following transport, the page 3 is presented. Preferably, such a cookie can be stored in a data storage unit of the output device A. Preferably, the contents database I transmits the cookie directly to the output device A in the proximity of the user. For this purpose, one of the output devices A receives, for example, a piece of information from the elevator control B that a user identified with an identification code is in its proximity. The proximate output device A announces itself, thereupon, to the contents database I. For example, the proximate output device A transmits the identification address of the identified user to the contents database I. The computer program product assigns a user profile with multimedia contents to this identification address and transmits multimedia contents of this user profile to this proximate output device A. The computer program product is written, for example, in a common and proven computer language. For example, the computer program product is stored in a storage unit and is loaded into a processor for the execution of the computer program product.

With respect to the structure of multimedia contents: A system architect presents multimedia contents, preferably, in a structure. The structure covers a framework, for example a sequence of pages, respectively columns in pages and in such framework multimedia contents are introduced. In a favorable embodiment form, multimedia contents are structured as Flash film with a software program named Flash from the company Macromedia. The software Flash permits the simple and rapid provision of appealing designs and unusual animations, which are provided with music. Other software such as HTML (Hypertext Markup LANGUAGE) can, of course, also be used.

Multimedia contents are categorized. The system architecture offers a multiplicity of categorized multimedia contents to the user in his user profile. Such categories are subdivided, preferably, into travelling preferences such as demographic travelling preferences, psychographics travelling preferences, as well as situational travelling preferences.

The demographic travelling preferences are for example:

The language presentation (for example: DE, GB, FR, IT, etc.).

The sex of the user (male/female).

The age of the user (for example: subdivided into age groups of 0–13, 14–20, 21–20 30, 31–40, 41–50, 51–65, 66–80, 81–120 years).

The civil status (for example: single, married, divorced, widowed).

The income (for example: subdivided into income classes of 0–30,000, 30,001–60,000, 60,001–90,000, 90,001–120,000, 120,001–180,000, >180,000 CHF/per year).

The psychographics travelling preferences are for example:

Information preferences (for example: weather forecast, horoscope, stock exchange briefing, sport news, topicalities, local news, etc.).

Culture preferences (for example: Italian meal, Chinese meal, wine, cigars, etc.).

Music preferences (for example: pop-music, classical music, jazz music, etc.)

Scent preferences (for example: lavender, peppermint, eucalyptus, etc.)

Light preferences (for example: violent lightning, mat warm light, etc.)

The situational travelling preferences are for example:

Zone preferences (for example: pre-determined zones, floors of the building G)

Period preferences (for example: pre-determined periods (in the morning, in the afternoon, at night), clock times (coffee break, lunch break), etc.)

Preferably, a computer program product is provided that categorizes multimedia contents for a user profile. The computer program product is written, for example, in a common and proven computer language. For example, the computer program product is stored in a storage unit and is loaded into a processor for the execution of the computer program product. Each category exhibits at least one specific multimedia content. Preferably, each category exhibits several specific multimedia contents. For example, the category "Information preferences" exhibits specific multimedia contents such as "weather forecast, horoscope, stock exchange briefing, sport news, topicalities, local news, etc." The different categories are linkable one to each other, in accordance with at least a logical element such as "AND", "OR", "NOT". For example, a psychographics travelling preference can be modulated through a situational travelling preference, for example, by adapting the "information preferences" with the "period preferences", in such a manner that, in the morning the weather forecast, at noon the stock exchange briefing and in the evening the topicalities are presented. Multimedia contents are thus scalable, i.e. in the three-dimensional space, which is extended through the dimensions of degree of customization, richness of content and range, and a structure with specific multimedia contents is made available to the user and such multimedia contents constitute for the user a valuable, optimal content.

With respect to the procurement of multimedia contents: Multimedia contents V are to be obtained, preferably, by a provider W. Preferably, the contents database M communicates with the provider W by means of communication tools such as the Internet and over established standard protocols such as TCP/IP (Transmission Control Protocol/Internet Protocol), FTP (File Transfer Protocol), etc. The contents database M works, preferably, with a software program based upon the Open Services Gateway initiative (OSGi) specification. OSGi has set a much-considered open standard, whereby the update, respectively upgrade possibilities of the multimedia contents V by the provider W enable topicality and a high level of customization. The multimedia contents V are provided, preferably, with a purchase order form, by the provider W. Preferably, a computer program product is provided that lists the multimedia contents to be updated and that for the entire contents database M and per actualization interval of the provider W. The computer program product is written, for example, in a common and proven computer language. For example, the computer program product is stored in a storage unit and is loaded into a processor for the execution of the computer program product. The actualization intervals can vary depending upon category, for example the horoscope is updated every 24 hours, the weather forecast is updated every 12 hours, while the stock exchange briefing is updated every 2 minutes. Representative actualization intervals are every: 24 hours; 8 hours; 2 hours; 60 minutes; 15 minutes; 2 minutes; 60 seconds; and/or 15 seconds.

With respect to the protection of the elevator installation: In accordance with FIG. 1, the contents database M is arranged as separate computing unit in the building G of the elevator installation, while the provider W with its multimedia contents V is located in and represent an external world outside the building G. In order to guarantee a safe operation of the elevator installation, i.e. to prevent with high probability a failure of the elevator installation because of hackers and Internet viruses, the contents database M is provided with a protective wall S. The communication of the contents database M with the proper elevator installation in the building G is made through this protective wall S. Preferably, a computer program product is provided, which loads multimedia contents through the protective wall S into the elevator installation. The computer program product is written, for example, in a common and proven computer language. For example, the computer program product is stored into a storage unit and is loaded into a processor for the execution of the computer program product. In particular the protective wall S supervises and regulates the access from the contents database M into the recognition devices E, into the examination devices P, into the identification database I, into the output devices A and into the elevator control B regulated via a standard protocol. Such a protective wall S is a software program, which is commercially obtainable from companies such as McAfee, PGP (Pretty Good Privacy), Symantec, etc. The protective wall S works with safety criteria such as identification number, crypto certificates, etc. Preferably, as shown in accordance with FIG. 1, such a protective wall S is installed in a separate personal computing unit. The contents database M arranged in the building G of the elevator installation is therefore readable and able to be written into for the external world via the standard protocol. Any hackers and Internet viruses are still prevented by the protective wall S from getting access to the recognition devices E, to the examination devices P, to the identification database I, to the output devices A and to the elevator control B. Instead of arranging the contents database M decentralized locally in the building G of the elevator installation, the contents database M can be just as well a central, national or global remote server, which serves centrally many elevator installations with multimedia contents in several buildings, cities and/or countries.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for the presentation of multimedia contents in elevator installations to identified users comprising the steps of:

a. providing for a user of an elevator installation a user profile including multimedia contents preferences selected by the user;

b. storing multimedia contents in a contents database separated from the elevator installation by a protective wall, the stored multimedia contents including selected multimedia contents associated with the multimedia contents preferences of the user;

c. identifying the user when the user is within a predetermined proximity to the elevator installation;

d. transmitting from the elevator installation a request for the selected multimedia contents based on the user profile with the multimedia contents preferences through the protective wall to the contents database; and e. transmitting the selected multimedia contents from the contents database through the protective wall to the elevator installation and presenting the selected multimedia contents to the user at an output device.

2. The method according to claim 1 including a step of obtaining the multimedia contents from at least one provider.

3. The method according to claim 1 including a step of providing the output device adjacent a hallway door to the elevator installation.

4. The method according to claim 1 including a step of providing the output device in an elevator car of the elevator installation.

5. The method according to claim 1 wherein said step e, is performed by presenting the selected multimedia contents in a predetermined sequence.

6. The method according to claim 5 wherein when the presentation sequence is not completed before the user leaves the predetermined proximity to the elevator installation, a current stage in the presentation sequence is noted and the next time said steps c, and d, are performed said step e, is performed by presenting the selected multimedia contents beginning at the noted current stage in the predetermined sequence.

7. The method according to claim 1 wherein said step a, is performed by the user selecting the multimedia contents preferences as at least one of information preferences, music preferences, scent preferences and light preferences.

8. The method according to claim 1 wherein said step a, is performed by the user entering the selected multimedia contents preferences at the output device.

9. The method according to claim 8 wherein said step a, is performed by the user confirming the user entered selected multimedia contents preferences at the output device.

10. A method forte presentation of multimedia contents in elevator installations to identified users comprising the steps of:

a. providing for a user of an elevator installation a user profile including multimedia contents preferences selected by the user;

b. storing multimedia contents in a contents database separated from the elevator installation by a protective wall, the stored multimedia contents including selected multimedia contents associated with the multimedia contents preferences of the user;

c. identifying the user when the user is within a predetermined proximity to the elevator installation;

d. transmitting a request for the selected multimedia contents based on the user and the user profile with the multimedia contents preferences from the elevator installation through the protective wall to the contents database;

e. transmitting the selected multimedia contents from the contents database to the elevator installation through the protective wall and presenting the selected multimedia contents to the user at a first output device adjacent a hallway door to the elevator installation when the user is proximate the first output device; and presenting the selected multimedia contents to the user at a second output device in an elevator car of the elevator installation when the user is in the elevator car.

11. The method according to claim 10 wherein said step a, is performed by the user selecting the multimedia contents preferences as at least one of information preferences, music preferences, scent preferences and light preferences.

12. The method according to claim 10 wherein said step a, is performed by the user entering the selected multimedia contents preferences at at least one of the first and second output devices.

13. The method according to claim 12 wherein said step a, is performed by the user confirming the user entered selected multimedia contents preferences at the at least one of the output devices.

14. The method according to claim 10 wherein said step e, is performed by presenting the selected multimedia contents in a predetermined sequence.

15. The method according to claim 14 wherein when the presentation sequence is not completed before the user leaves the predetermined proximity to the elevator installation, a current stage in the presentation sequence is noted and the next time said steps c, and d, are performed said step e, is performed by presenting the selected multimedia contents beginning at the noted current stage in the predetermined sequence.

16. A system for the presentation of multimedia contents in elevator installations to identified users comprising:

recognition means for recognizing an identification code of a user of an elevator installation;

examination means connected to said recognition means for identifying the recognized identification code;

an identification database for storing a user profile with multimedia contents preferences selected by the user and being connected to said examination means;

a contents database storing multimedia contents including selected multimedia contents associated with the multimedia contents preferences and being connected to said examination means and said identification database;

a protective wall connected between said contents database and said examination means and between said contents database and said identification database; and a plurality of output devices positioned at floors and in a car of the elevator installation and connected to said examination means for presenting to the user on a one of said output devices in proximity to the user said selected multimedia contents when the recognized identification code is identified by said examination means.

17. The system according to claim 16 wherein at least one of said output devices includes means for the user to enter said multimedia contents preferences into said identification database.

18. The system according to claim 17 wherein said at least one output device includes means for the user to confirm entry of said multimedia contents preferences into said identification database.

* * * * *